(12) United States Patent
Akiyama et al.

(10) Patent No.: US 6,809,849 B2
(45) Date of Patent: Oct. 26, 2004

(54) CONTROL APPARATUS AND CONTROL METHOD FOR AN OPTICAL METHOD

(75) Inventors: Yuichi Akiyama, Kawasaki (JP); George Ishikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 69 days.

(21) Appl. No.: 10/391,813

(22) Filed: Mar. 20, 2003

(65) Prior Publication Data

US 2003/0184838 A1 Oct. 2, 2003

(30) Foreign Application Priority Data

Mar. 26, 2002 (JP) .......................... 2002-087017

(51) Int. Cl.[7] .............................. G02F 1/00; G02F 1/01; H04B 10/04; H04B 10/12
(52) U.S. Cl. ...................... 359/237; 359/239; 359/279; 398/185; 398/183; 398/188; 398/147
(58) Field of Search ................................. 359/237, 239, 359/279; 398/185, 182, 183, 188, 191, 142, 147, 148, 61

(56) References Cited

U.S. PATENT DOCUMENTS

| | | | |
|---|---|---|---|
| 5,184,243 A | * | 2/1993 | Henmi et al. ............... 398/147 |
| 6,559,996 B1 | * | 5/2003 | Miyamoto et al. .......... 398/183 |
| 6,721,081 B1 | * | 4/2004 | Mauro et al. ............... 359/279 |
| 2003/0002121 A1 | * | 1/2003 | Miyamoto et al. .......... 398/185 |
| 2003/0175036 A1 | * | 9/2003 | Mamyshev et al. ......... 398/188 |
| 2003/0189745 A1 | * | 10/2003 | Kikuchi et al. ............. 359/237 |

FOREIGN PATENT DOCUMENTS

| | | |
|---|---|---|
| JP | 11-72761 | 3/1999 |
| JP | 2000-122015 | 4/2000 |
| JP | 2002-77053 | 3/2002 |

OTHER PUBLICATIONS

Yutaka Miyamoto, et al., "320 Gbit/s (8=40 Gbit/s WDM transmission over 367-km zero dispersion-flattened-line with 120-km repeater spacing using carrier-suppressed return-to-zero pulse format", OAA 1999, pp. 4-1 to 4-4.

* cited by examiner

*Primary Examiner*—Loha Ben
(74) *Attorney, Agent, or Firm*—Staas & Halsey LLP

(57) ABSTRACT

The present invention aims at providing a control technique for an optical modulator, which can accurately detect a phase shift between signals of a drive system of an optical modulator, to feedback control. To this end, a control apparatus of the present invention comprises, for example, in an optical modulator which generates a signal light corresponding to the CS-RZ modulation method by two LN modulators connected in series: a monitor section that extracts a specific frequency component from a spectrum of the CS-RZ signal light output from a latter LN modulator to detect the optical intensity thereof, and a control CPU that determines a phase shift between first and second drive signals corresponding to a clock signal supplied to the latter LN modulator based on the optical intensity detected by the monitor section, and controls a phase difference between the drive signals so that the phase shift is minimized.

10 Claims, 17 Drawing Sheets

FIG.2
OPTICAL WAVEFORM    OTICAL SPECTRUM
NO PHASE VARIATION
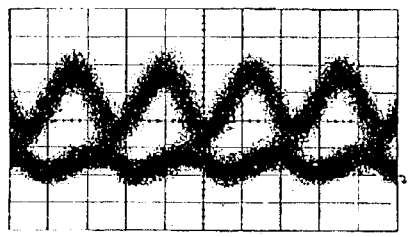 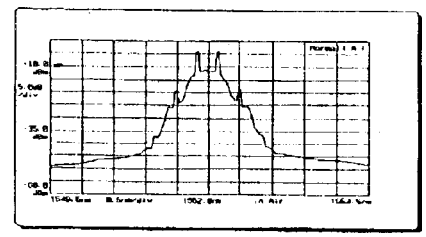
PHASE VARIATION OF 5ps
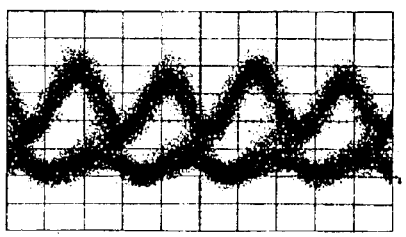 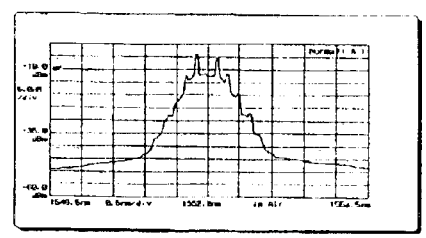
PHASE VARIATION OF 10ps
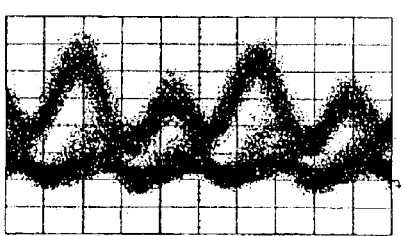 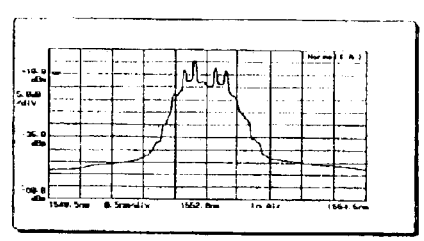
PHASE VARIATION OF 15ps
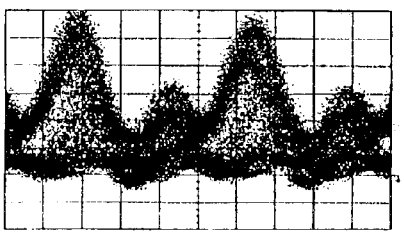 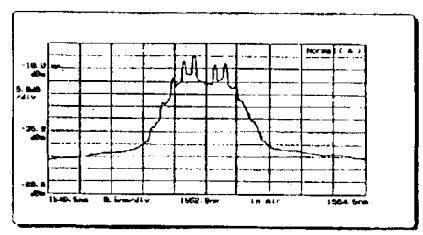
PHASE VARIATION OF 20ps
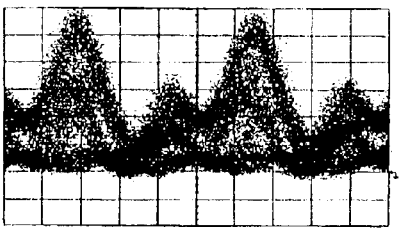 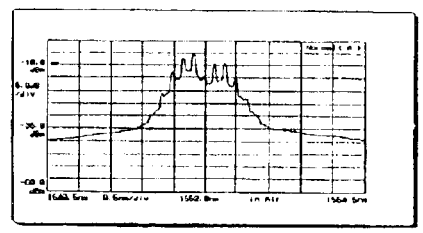
PHASE VARIATION OF 25ps
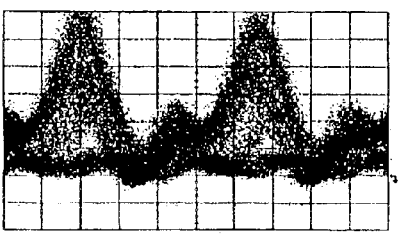 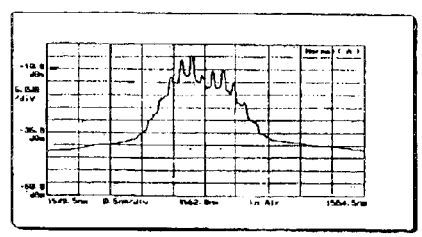

FIG.3
OTICAL SPECTRUM
NO PHASE VARIATION
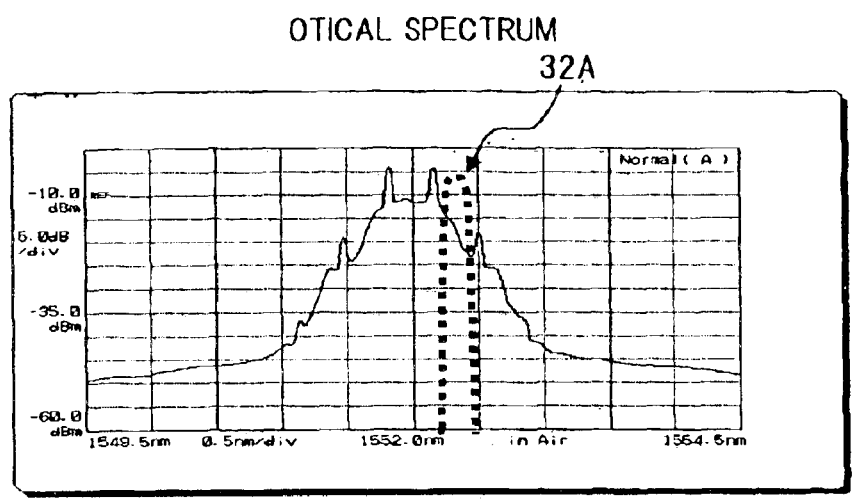
PHASE VARIATION OF 5ps
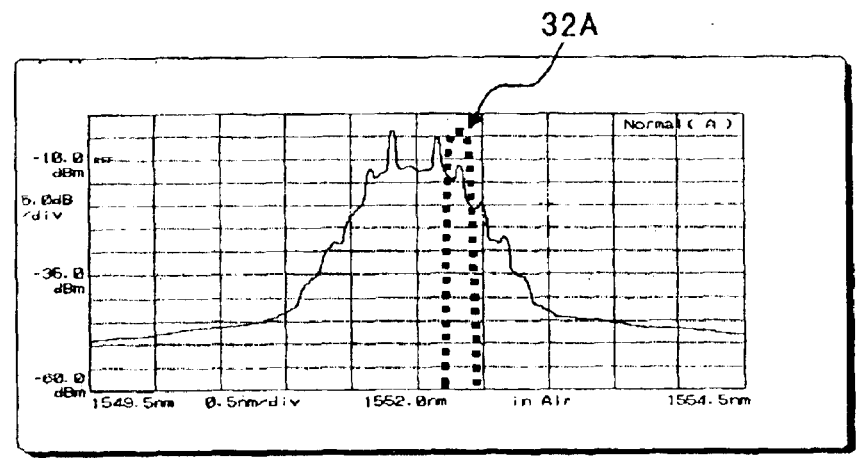
PHASE VARIATION OF 10ps
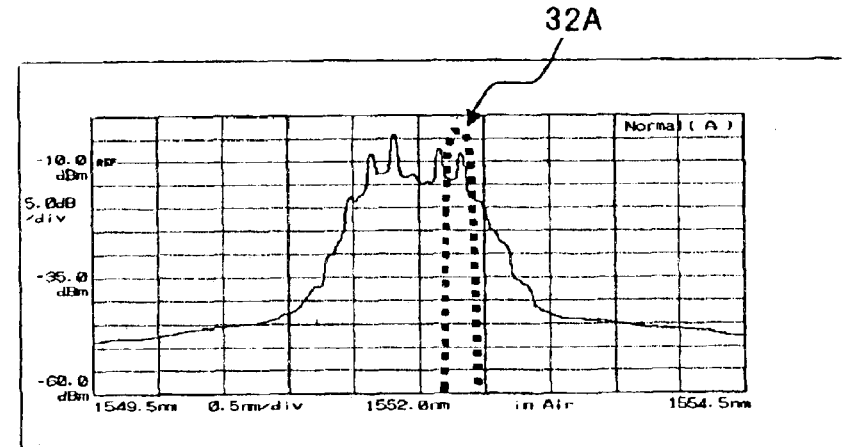

FIG.5
OTICAL SPECTRUM
NO PHASE VARIATION
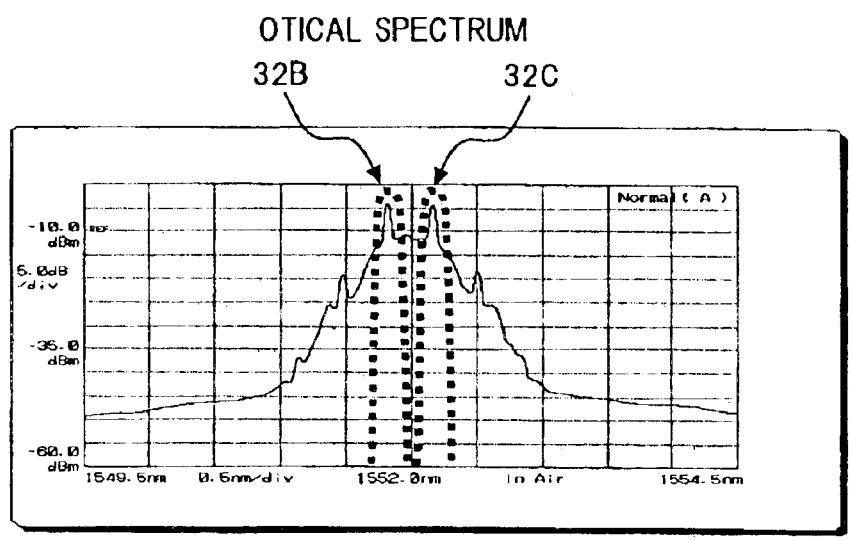
PHASE VARIATION OF 5ps
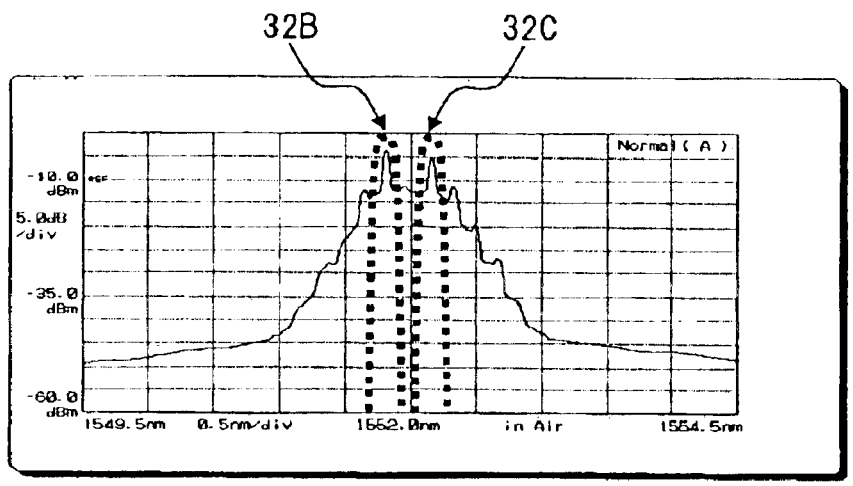
PHASE VARIATION OF 10ps
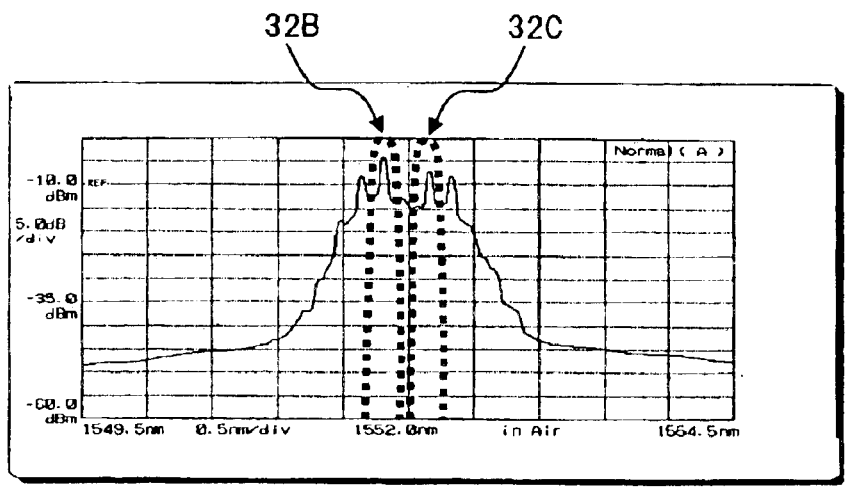

FIG.7
OPTICAL WAVEFORM    OTICAL SPECTRUM
NO PHASE VARIATION
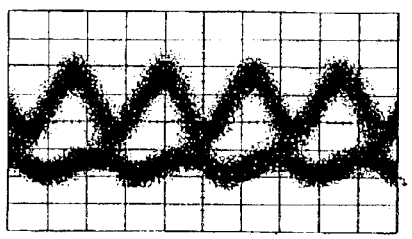 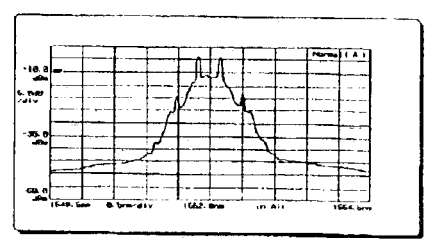
PHASE VARIATION OF 5ps
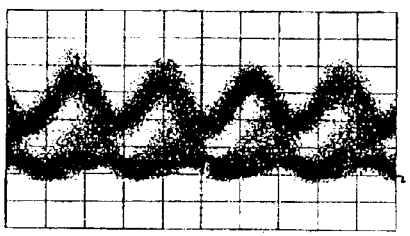 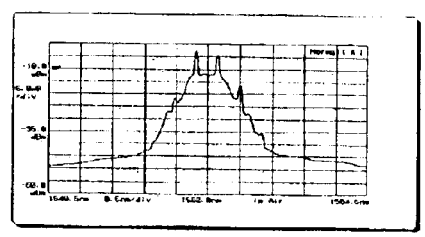
PHASE VARIATION OF 10ps
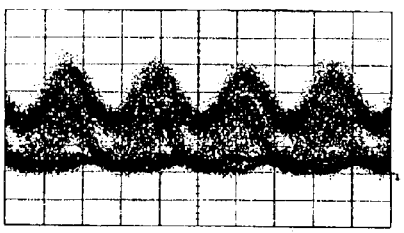 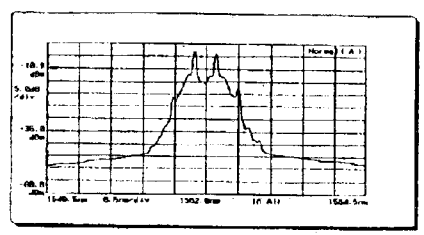
PHASE VARIATION OF 15ps
 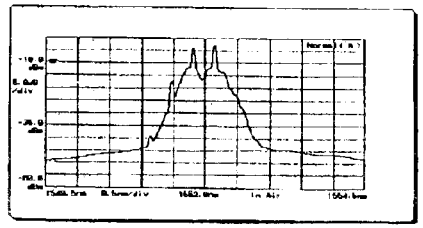
PHASE VARIATION OF 20ps
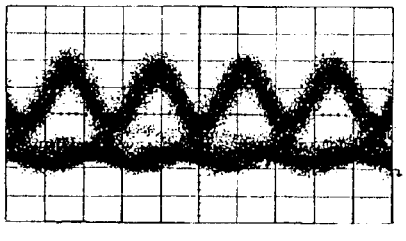 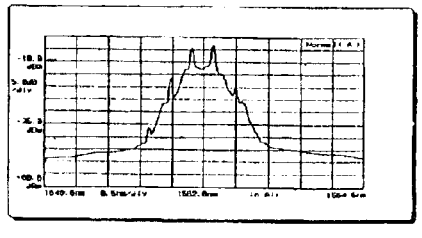
PHASE VARIATION OF 25ps
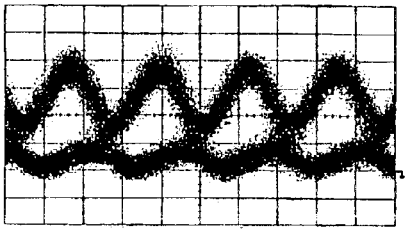 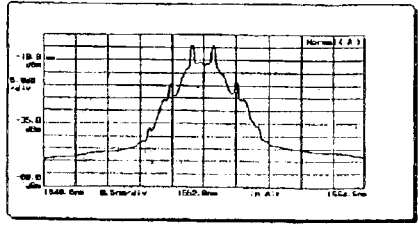

FIG.8
OTICAL SPECTRUM
NO PHASE VARIATION
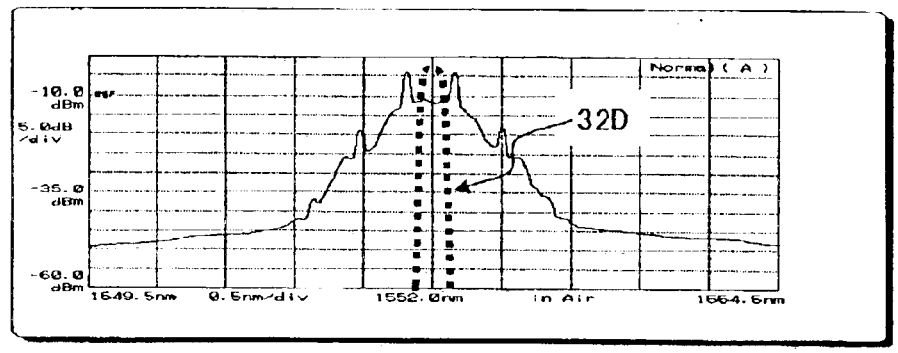
PHASE VARIATION OF 5ps
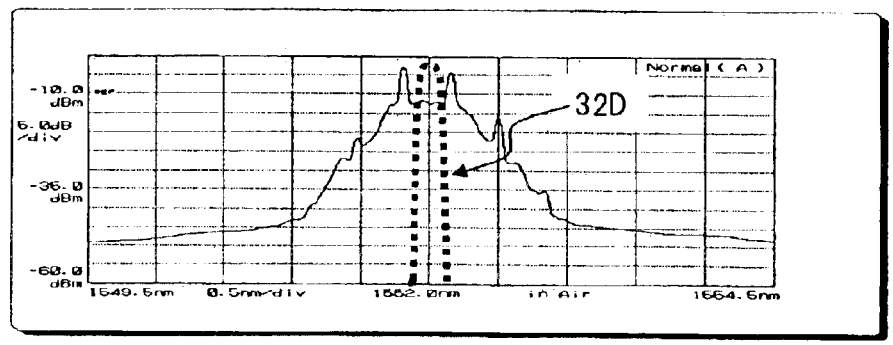
PHASE VARIATION OF 10ps
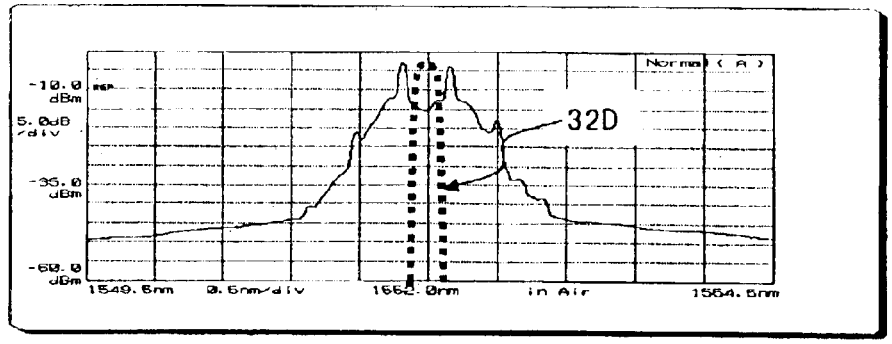
PHASE VARIATION OF 15ps
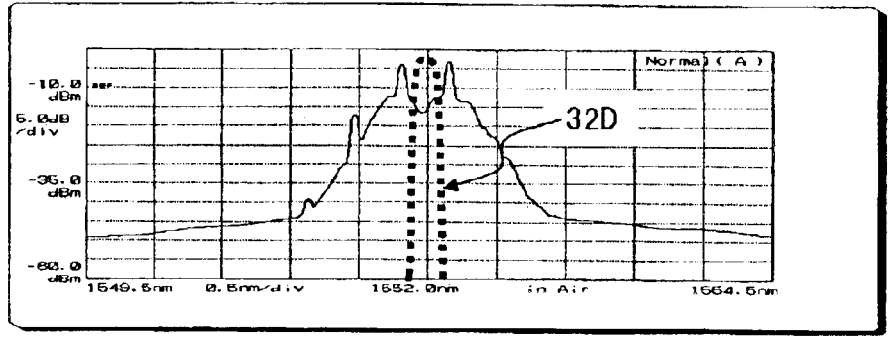

FIG.10
OTICAL SPECTRUM
NO PHASE VARIATION
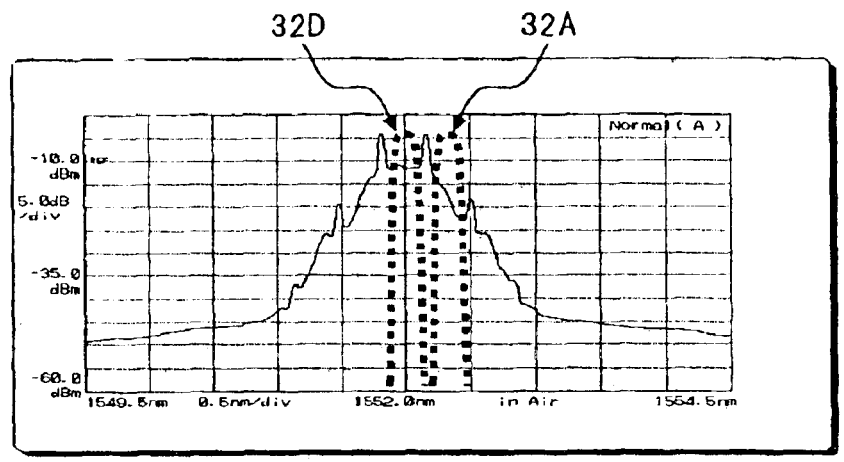
PHASE VARIATION OF 5ps
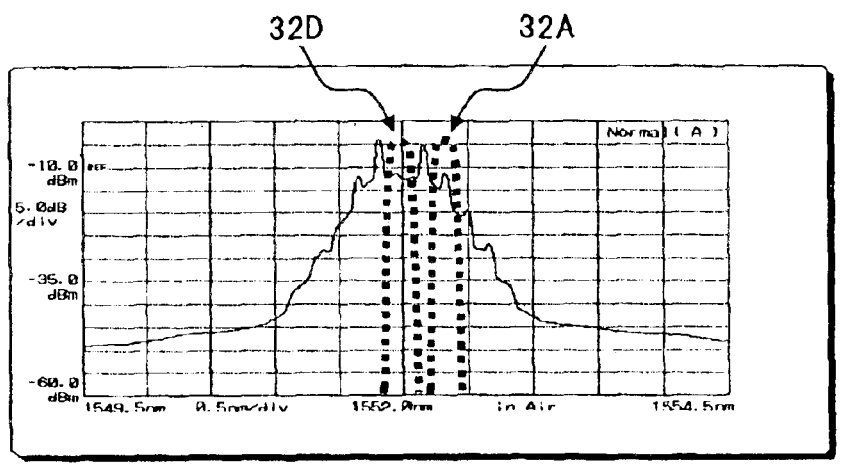
PHASE VARIATION OF 10ps
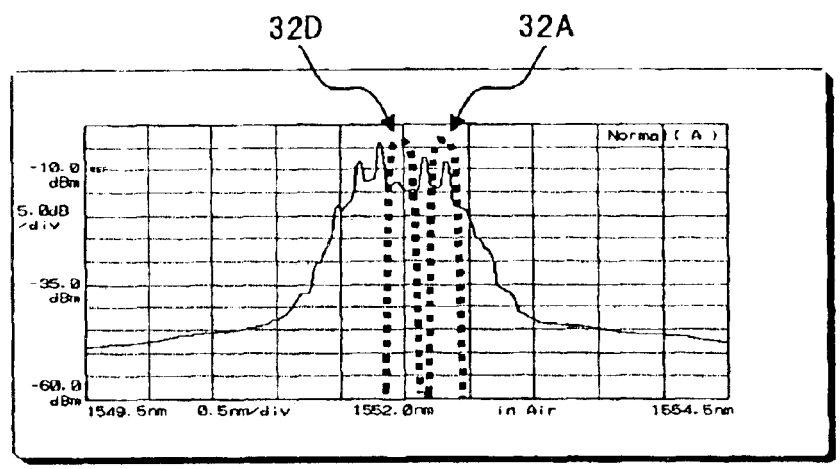

FIG.14
RELATED ART
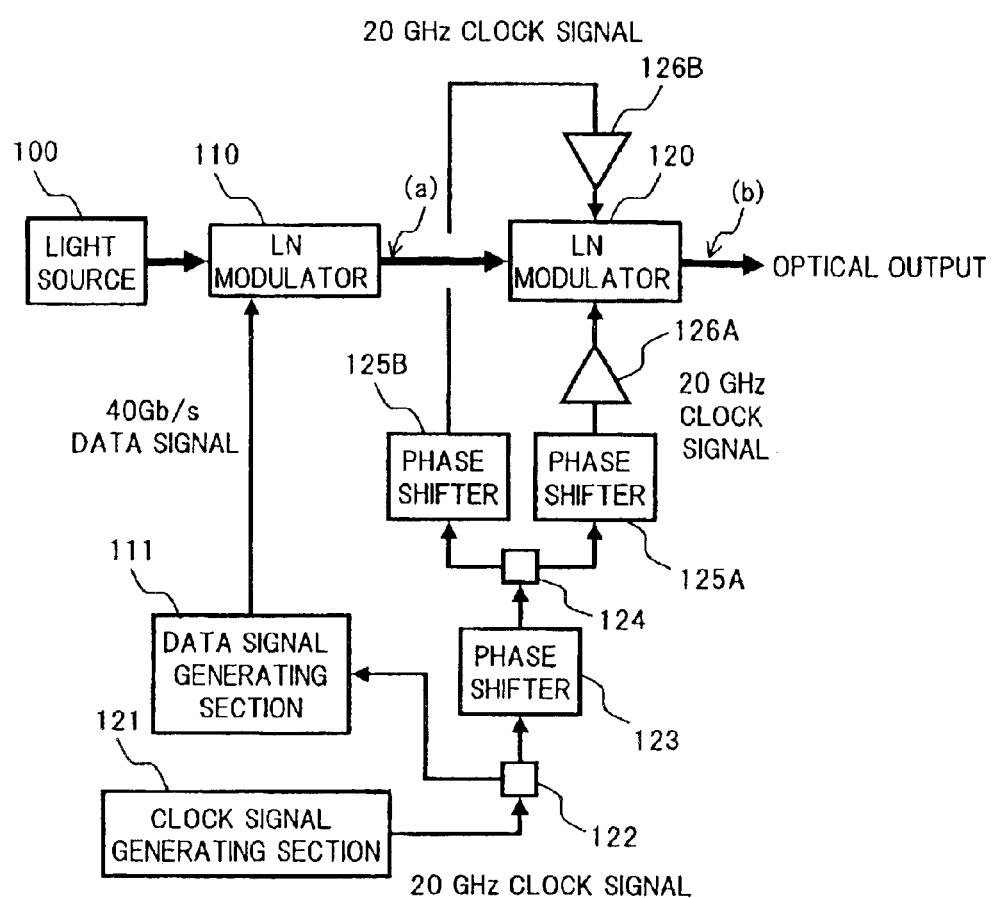
FIG.15
RELATED ART
(a) 40Gb/s NRZ MODULATED SIGNAL LIGHT
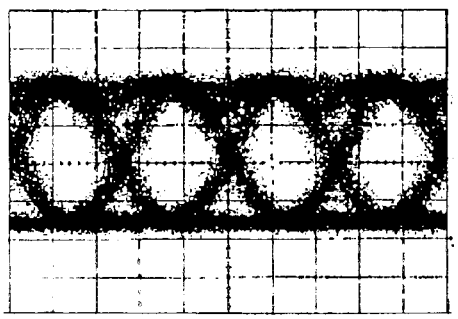
(b) 40Gb/s CS-RZ MODULATED SIGNAL LIGHT
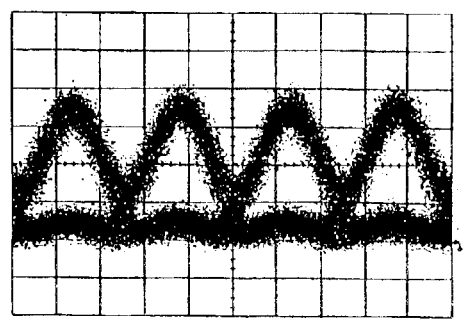

FIG.16
RELATED ART
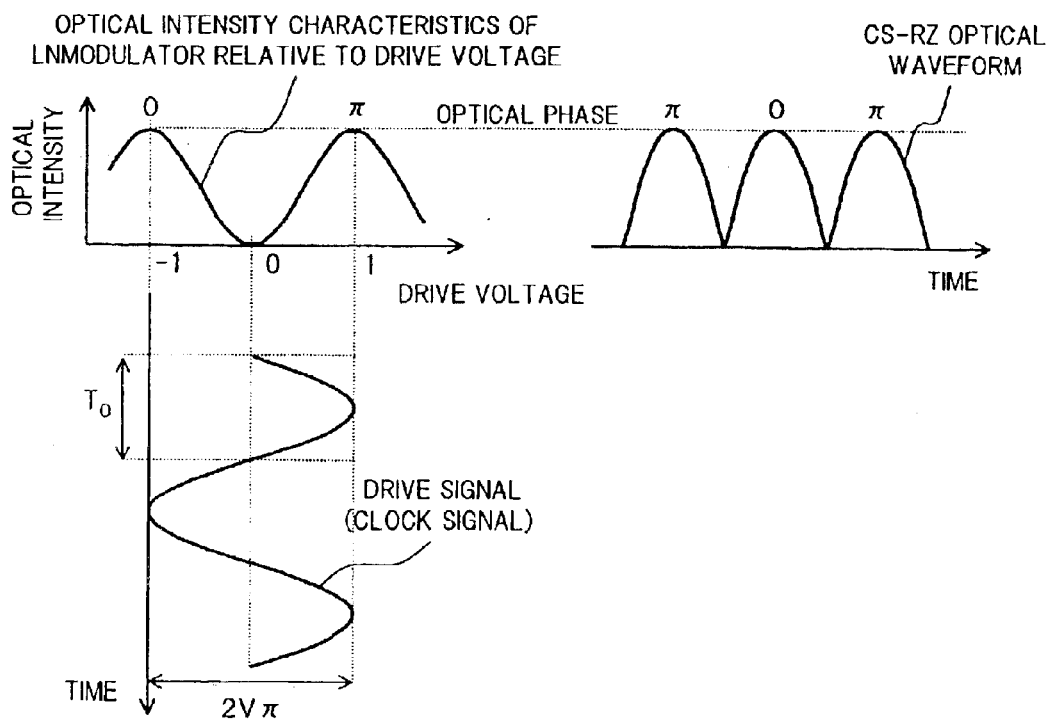
FIG.17
RELATED ART
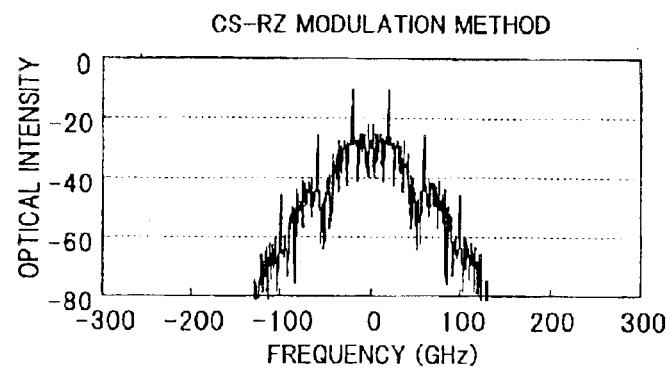
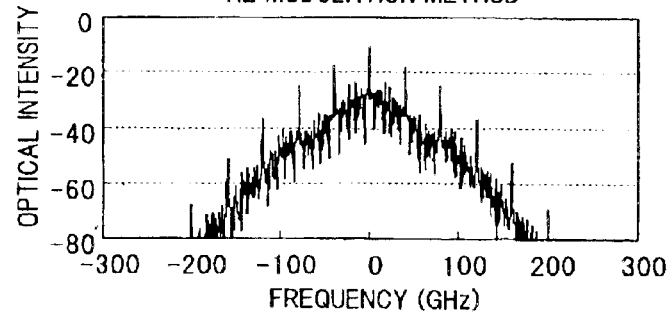

FIG.19
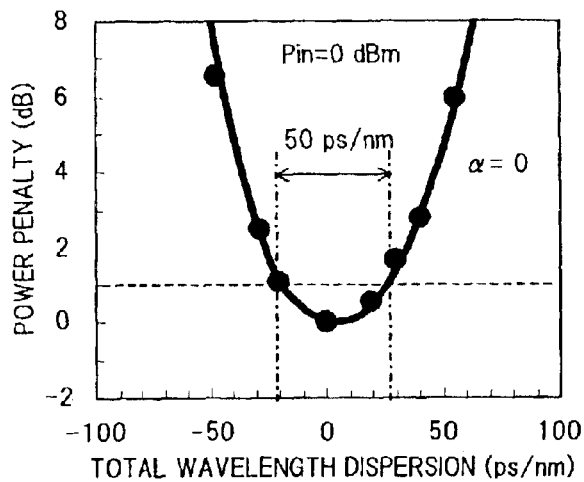
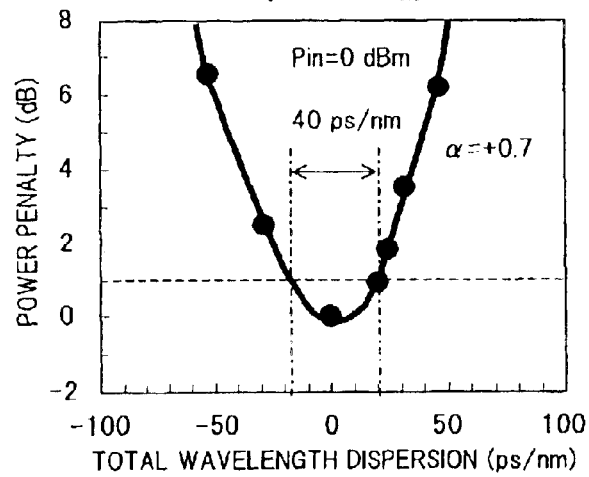
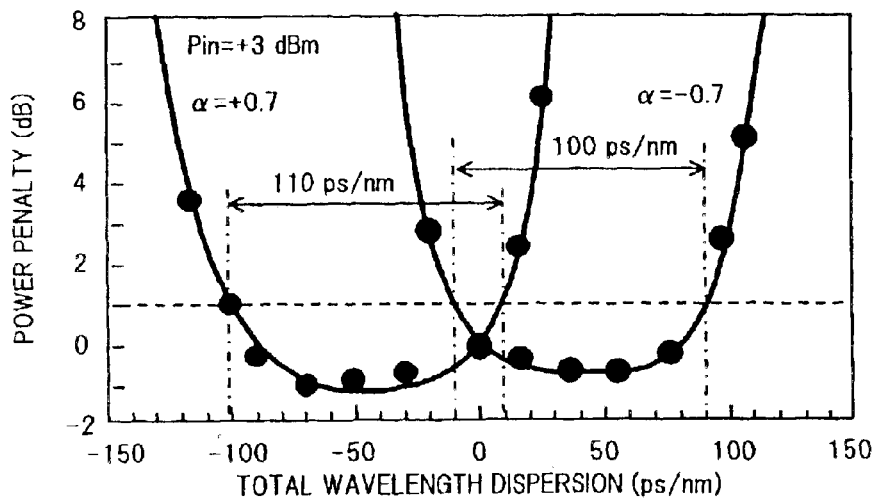

CONTROL APPARATUS AND CONTROL METHOD FOR AN OPTICAL METHOD

BACKGROUND OF THE INVENTION

1. Field of the Invention

The present invention relates to a control technique for an optical modulator used in optical communications, and in particular, relates to a control technique for an optical modulator suitable for generating signal light corresponding to the Carrier-Suppressed RZ (Carrier Suppressed Return-to-Zero: to be referred to as CS-RZ below) modulation method.

2. Description of the Background Art

At present, optical transmission systems in which optical signals are transmitted at speeds of around 10 Gb/s are beginning to be in practical use, but due to the recent rapid increase in network usage, further increases in network capacity are sought, and in addition, demand for implementation over even longer distances is increasing.

In optical transmission systems with transmission speeds of 10 Gb/s or more, because the affect of wavelength dispersion on the waveforms is large and the optical spectrum is broadened, WDM transmission in which channel lights are arranged with a high level of density is difficult. Particularly, in 40 Gb/s optical transmission systems, wavelength dispersion is one of factors limiting the transmission distance.

Dispersion compensation technology in which a dispersion amount in the optical transmission path is accurately measured to compensate has been investigated as a method of solving the problems described above (Japanese Unexamined Patent Publication No. 11-72761 and Japanese Unexamined Patent Publication No. 2002-077053). Furthermore, in order to realize such an optical transmission system as described above, the development of a modulation method with an even slightly higher dispersion tolerance is essential. Specifically, in order to achieve a long distance optical transmission system, a modulation method in which an excellent optical S/N ratio can be ensured, in other words, a modulation method which is resistant to the self phase modulation (SPM) effect and for which the upper limit of the power of optical input to the optical transmission path can be made high, is required. In addition, in order to increase capacity, a modulation method with a narrow optical spectrum allowing high density WDM optical transmission is required.

Recently, research has been conducted into new modulation methods such as the carrier suppressed RZ (CS-RZ) modulation method (for example, Y Miyamoto et. al., "320 Gbit/s (8×40 Gbit/s) WDM transmission over 367 km zero-dispersion-flattened line with 120 km repeater spacing using carrier-suppressed return-to-zero pulse format", OAA'99 PD, PdP4 and the like). An advantage of this CS-RZ modulation method is that because, as described below, the optical spectrum width is $2/3$ times that of the RZ modulation method, the waveform dispersion tolerance is broad, and the high density channel arrangement in WDM is possible. Furthermore, because waveform degradation due to the self phase modulation (SPM) effect is minimal, it becomes possible to ensure an optical S/N ratio suitable for long distance transmission.

FIG. 14 is a diagram showing a basic structure for generating a 40 Gb/s CS-RZ modulation signal.

In FIG. 14, a light source 100 generates continuous light. The continuous light output from this light source 100 is input, in sequence, to two $LiNbO_3$ modulators 110 and 120 (to be referred to as LN modulators below) connected in series, to thereby be modulated.

For example, a data signal, generated in a data signal generating section 111, with a bit rate of 40 Gb/s and-corresponding to an NRZ modulation method is applied to a signal electrode (not shown in the figure) of the former LN modulator as a drive signal, and as a result, the former LN modulator 110 modulates the continuous light from the light source 100 according to the data signal, and outputs a 40 Gb/s NRZ signal light having a waveform as illustrated in (a) of FIG. 15 to the latter LN modulator 120.

As the latter LN modulator 120, a Mach-Zehnder (MZ) modulator with two signal electrodes is used, for example. The latter LN modulator 120 further modulates the NRZ signal light received from the former LN modulator 110 as a result that a first drive signal and a second drive signal generated based on a clock signal with a frequency of ½ times the bit rate of the data signal are applied to the respective signal electrodes thereof, and outputs a 40 Gb/s CS-RZ signal light having a waveform as illustrated in (b) of FIG. 15. Here, a clock signal with a frequency of 20 GHz which has a waveform such as a sine wave is generated in a clock signal generator 121, and after being split into two in a splitter 124, the split clock signals are adjusted in the phase shifters 125A, 125B, respectively so that a phase difference between the split clock signals is approximately 180°, and further, respective amplitudes of the clock signals are adjusted in amplifiers 126A and 126B, respectively, to become the first and second drive signals to be applied to each signal electrode of the LN modulator 120.

Furthermore, a part of the clock signal generated in the clock signal generator 121 is split in a splitter 122 and sent to the data signal generating section 111, and the phase difference between each signal is controlled by adjusting the phase of the clock signal by a phase shifter 123, so that phases of the data signal and the clock signal are synchronized.

Here, the principle of generating a 40 Gb/s CS-RZ signal light is described simply using the optical intensity characteristics relative to the drive voltage of the LN modulator, as shown in FIG. 16.

Generally, when generating a signal light corresponding to the NRZ modulation method or the RZ modulation method, using an optical modulator in which the optical intensity characteristics varies periodically relative to the drive voltage, modulation is performed by supplying, to the optical modulator, a drive voltage (hereafter, this drive voltage is referred to as Vπ) which corresponds to the "peaks and valleys" or the "valleys and peaks" which adjoin each other in the optical intensity characteristics. Here, the "peak" of the optical intensity characteristics refers to the apex of light emission, and the 'valley' refers to the apex of light extinction.

On the other hand, when generating signal light corresponding to the CS-RZ modulation method, the 40 Gb/s NRZ signal light which was modulated in accordance with the data signal in the former LN modulator 110 shown in FIG. 14, is further modulated in the latter LN modulator 120, according to a 20 GHz clock signal with a frequency of ½ times the bit rate of the data signal. And as shown in the left of FIG. 16, a drive voltage (hereafter, this drive voltage is referred to as 2Vπ) which corresponds to the "peak, valley, peak" of the optical intensity characteristics relative to the drive voltage is supplied to this latter LN modulator 120. This modulation of light is performed with each level −1, 0, 1 of the clock signal corresponding respectively to an on, off, on state of the light, and the generated CS-RZ signal light becomes a binary optical waveform as shown on the right of FIG. 16. For the signal light in this CS-RZ modulation method, because the optical phase of each bit has a value of either 0 or π, then as shown in the calculation results of the optical spectrum in FIG. 17, the carrier component of the optical spectrum is suppressed in comparison with the signal light in the RZ modulation method.

As seen in the results of experiments on the optical spectrum and the optical waveform shown in FIG. 18, for example, the signal light in the CS-RZ modulation method generated in the manner described above has an optical waveform approximately equal in shape to the optical waveform obtained by the RZ modulation method, but the optical spectrum width is narrower than that in the RZ modulation method. Furthermore, as seen in the results of experiments relating to wavelength dispersion tolerance shown in FIG. 19, for example, the range of total wavelength dispersion for which the power penalty is 1 dB or less, is approximately 40 ps/nm in the case of the RZ modulation method, and is approximately 50 ps/nm in the case of the CS-RZ modulation method. It is apparent that a dispersion tolerance of the signal light in the CS-RZ modulation method is expanded compared with that of the signal light in the RZ modulation method.

However, although the signal light corresponding to the CS-RZ modulation method has the advantages described above, there are also disadvantages in that the phase difference between the first and second drive signals, which are applied to the latter optical modulator, and are driven based on the clock signal, must be precisely adjusted, and that the phase difference between the data signal and the clock signal, which are used to drive the former optical modulator must also be precisely adjusted. In addition, because there is a possibility that a phase shift may occur due to environmental variation such as variations in temperature, phase variation in each signal must be detected to perform a feedback control, during system operation.

However, no specific technology relating to the detection of phase shift between the drive signals, and the feedback control for an optical modulator for use with the CS-RZ modulation method has yet been proposed.

SUMMARY OF THE INVENTION

In view of the above circumstances, an object of the present invention is to provide a control technique for an optical modulator, which can accurately detect a phase shift between signals of drive system of the optical modulator, and can control a phase difference between the drive signals so that optimal drive conditions can be obtained in a stable manner.

In order to achieve the aforementioned object, according to one aspect of the present invention, a control apparatus for an optical modulator which generates a signal light corresponding to the CS-RZ modulation method, comprises: a monitor section that extracts a specific frequency component from an optical spectrum of signal light output from the optical modulator to detect the optical intensity thereof; and a control section that determines a phase shift between a plurality of drive signals supplied to the optical modulator based on the optical intensity detected by the monitor section, and controls a phase difference between the drive signals so that the phase shift is minimized.

In this construction, the optical intensity of the specific frequency component of the CS-RZ signal light output from the optical modulator is detected by the monitor section, and based on this optical intensity, the phase shift between the plurality of drive signals supplied to the optical modulator is determined by the control section, and the phase difference between the drive signals is then optimized so that the phase shift is minimized. Consequently, it becomes possible to generate a CS-RZ signal light under stable drive conditions.

Furthermore, in the aforementioned control apparatus for an optical modulator, the optical modulator includes a data side optical modulation section to which a drive signal corresponding to a data signal is supplied, and a clock side optical modulation section to which at least two drive signals corresponding to a clock signal with a frequency of ½ times the bit rate of the data signal are supplied, and the control section may determine, based on the optical intensity detected in the monitor section, at least one of a phase shift between the drive signals supplied to the clock side optical modulation section and a phase shift between the data signal and the clock signal, to feedback control a phase difference between the these signals so that the phase shift is minimized.

Consequently, the feedback control of the phase shift between the drive signals supplied to the clock side optical modulator, the feedback control of the phase shift between the data signal and the clock signal, or the feedback control of the phase shifts is performed by the control section.

Another aspect of a control apparatus for an optical modulator according to the present invention comprises: an optical modulator incorporating a section for branching an optical waveguide into a first branch optical waveguide and a second branch optical waveguide, and a section for combining these first and second branch optical waveguides, that controls the refractive indexes of the first and second branch optical waveguides using a first electrode and a second electrode which are provided in the first and second branch optical waveguides respectively, to obtain periodic optical intensity characteristics corresponding to a difference between the refractive indexes; a drive circuit that applies a voltage to the first and second electrodes so that a modulation operation is performed based on one cycle of the optical intensity characteristics of the optical modulator; a phase controller that controls the phase of this drive circuit; and a detector that detects a specific optical wavelength component in an output of the optical modulator, wherein the phase of the drive circuit is controlled by the phase controller based on the detection result from the detector.

In this construction, a specific optical wavelength component of the signal light output from the optical modulator is detected by the detector, and based on this detection result, the phase shift between voltage signals applied to the first and second electrodes of the optical modulator is controlled by the phase controller. Consequently, it becomes possible to generate, under stable drive conditions, a signal light modulated based on one cycle of the optical intensity characteristics of the optical modulator.

Other objects, characteristics and advantages of the present invention will become apparent from the following description of the embodiments in relation to the appended drawings.

BRIEF DESCRIPTION OF THE DRAWINGS

FIG. 2 is a diagram, related to the first embodiment, showing the test results of measuring the spectrum and optical waveform of a CS-RZ signal light generated when a phase between drive signals corresponding to a clock signal is varied.

FIG. 3 is a diagram showing specifically spectra of the CS-RZ signal light generated in the first embodiment described above, in response to phase variation.

FIG. 5 is a diagram showing specifically spectra of the CS-RZ signal light generated in the second embodiment described above, in response to phase variation.

FIG. 7 is a diagram, related to the third embodiment, showing the test results of measuring the spectrum and optical waveform of the CS-RZ signal light generated when a phase between a data signal and a clock signal is varied.

FIG. 8 is a diagram showing specifically spectra of the CS-RZ signal light generated in the third embodiment described above, in response to phase variation.

FIG. 10 is a diagram showing specifically spectra of the CS-RZ signal light generated in the fourth embodiment described above, in response to phase variation.

FIG. 14 is a diagram showing a basic structure for generating a CS-RZ modulated signal.

FIG. 15 is a diagram showing examples of waveforms of a signal light generated in the basic structure in FIG. 14, wherein (a) is an output waveform from a former LN modulator and (b) is an output waveform from a latter LN modulator.

FIG. 16 is a diagram for explaining the principle of generating a CS-RZ signal light.

FIG. 17 is a diagram showing calculation results for explaining that the carrier component of the spectrum of the CS-RZ signal light is suppressed.

FIG. 19 is a diagram showing test results for explaining the characteristics of the CS-RZ signal light relating to waveform dispersion tolerance.

DETAILED DESCRIPTION OF THE INVENTION

As follows is a description of embodiments of the present invention based on the drawings.

Figure 1:
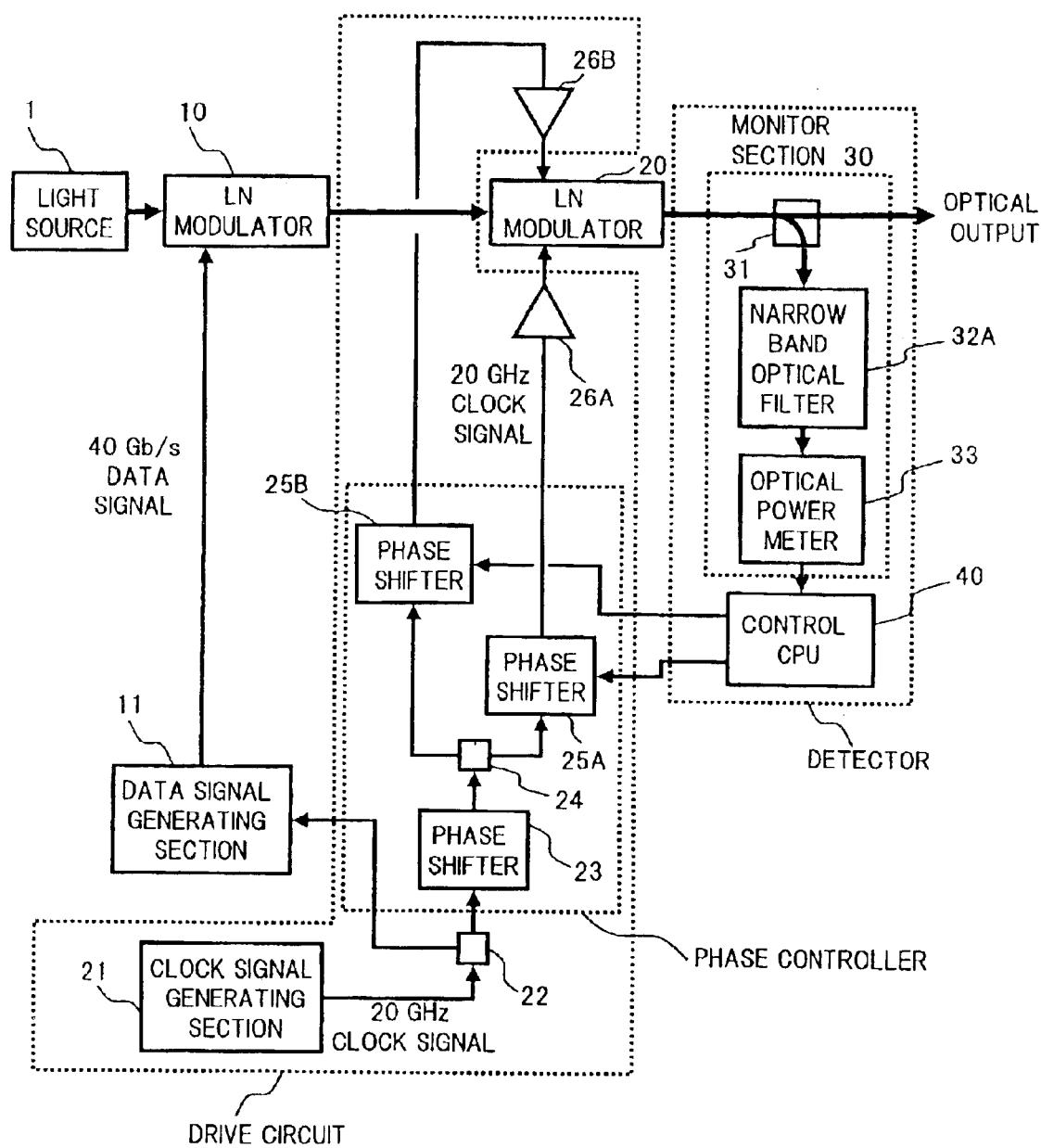
FIG. 1 is a block diagram showing the structure of a first embodiment of a control apparatus for an optical modulator according to the present invention.

FIG. 1 is a block diagram showing the structure of a first embodiment of a control apparatus for an optical modulator according to the present invention.

In FIG. 1, in the optical modulator, continuous light generated by a light source 1 is received, in sequence, and modulated by two LN modulators 10 and 20 connected in series, and a signal light corresponding to the CS-RZ modulation method is output. In this optical modulator, there is provided a monitor section 30 that monitors the optical intensity of a specific frequency component in a spectrum of the signal light passed through each of the LN modulators 10 and 20, and a control CPU 40 that determines a phase shift between drive signals supplied to the LN modulator 20 based on the monitor results, and controls a phase of each drive signal so that the phase shift is minimized. Here, the LN modulator 10 corresponds to a data side optical modulation section, and the LN modulator 20 corresponds to a clock side optical modulation section.

The former LN modulator 10 is applied with, at a signal electrode thereof (not shown in the figure), a data signal generated in a data signal generating section 11, with a bit rate of Bb/s (for example 40 Gb/s) corresponding to the NRZ modulation method, as a drive signal, and hence modulates the continuous light from the light source 1, to output a Bb/s NRZ signal light to the latter LN modulator 20.

The latter LN modulator 20 is a Mach-Zehnder optical modulator constructed by a lithium niobate (LN) substrate, which includes a section for branching an optical waveguide into a first branch optical waveguide and a second branch optical waveguide, and a section for combining these first and second branch optical waveguides, and controls the refractive indexes of these first and second branch optical waveguides using first and second electrodes (signal electrodes) provided in the first and second branch optical waveguides, respectively to obtain periodic optical intensity characteristics according to a difference between the refractive indexes. Voltages are supplied to the first and second electrodes of the LN modulator 20 by a drive circuit comprising a clock signal generating section 21, splitters 22, 24, phase shifters 23, 25A, 25B and amplifiers 26A, 26B. These drive voltages are adjusted with amplitudes thereof by the amplifiers 26A, 26B so that the optical intensity characteristics of the optical modulator becomes one cycle, depending on an electric potential difference between the first and second electrodes, and phases thereof by a phase controller comprising the phase shifters 23, 25A and 25B, and are then applied to each electrode. When the first drive signal and the second drive signal generated based on a clock signal with a frequency of ½ times the bit rate of the data signal, or in other words a frequency of B/2 Hz (for example 20 GHz), are applied to each signal electrode of the latter LN modulator 20, the latter LN modulator 20 further modulates the NRZ signal light from the former LN modulator 10 to output a 40 Gb/s CS-RZ signal light. Here, a clock signal with a frequency of B/2 Hz and having a waveform, such as a sine wave, is generated in the clock signal generating section 21, and is split into two in the splitter 24. After the phases of split clock signals are respectively adjusted in the phase shifters 25A, 25B controlled in accordance with an output signal from the control CPU 40 (to be described below), the amplitudes of the split clock signals are respectively adjusted in the amplifiers 26A, 26B, and then the split clock signals are applied to each of the signal electrodes of the LN modulator 20 as the first and second drive signals.

Furthermore, the splitter 22 and the phase shifter 23 provided between the clock signal generating section 21 and the splitter 24 are for adjusting phases of the data signal and the clock signal. Specifically, a part of the clock signal generated in the clock signal generating section 21 is split by the splitter 22 to be transmitted to the data signal generating section 11 so that phase synchronization is performed between the data signal and the clock signal, and a phase difference between these signals is controlled by adjusting the phase of the clock signal by the phase shifter 23.

It is possible to use, for example, variable length coaxial tube type phase shifters or voltage controlled type phase shifters as the phase shifters 25A, 25B which adjust the phase difference between the drive signals corresponding to the clock signal described above, and as the phase shifter 23 which adjusts the phase difference between the data signal and the clock signal.

The monitor section 30 comprises, for example, an optical coupler 31, a narrow band optical filter 32A, an optical power meter 33 and the control CPU 40. The optical coupler 31 splits a part of the signal light of the CS-RZ modulation method output from the latter LN modulator 20 as a monitor light, and sends this monitor light to the narrow band optical filter 32A. The narrow band optical filter 32A has a sufficiently narrow bandwidth of the transmission band and a center frequency (center wavelength) of the transmission band which has preset filter characteristics in accordance with the bit rate of the data signal as described below, and extracts only a desired frequency component from the monitor light split in the optical coupler 31. The optical power meter 33 measures the power (optical intensity) of the monitor light extracted in the narrow band optical filter 32A, and outputs the results to the control CPU 40. Here, the CPU 40 feedback controls phase adjustment amounts in the phase shifters 25A, 25B which adjust the phases of each drive signal to be supplied to the latter LN modulator 20, based on the power of the monitor light as measured by the optical power meter 33. This feedback control by the control CPU 40 is performed based on variation characteristics of the signal light spectrum of the CS-RZ modulation method relative to the phase variation between the drive signals corresponding to the clock signal, as described below. Here, the monitor section 30 and the control CPU 40 function as a detector.

FIG. 2 is a diagram showing the results of measuring the spectrum and optical waveform of a 40 Gb/s signal light of CS-RZ modulation method generated when the phases of the drive signals corresponding to the clock signal are varied. Here, the phase of each drive signal is varied so that the phase shift increases in units of 5 ps, with a state in which the phase difference between the drive signals supplied to the LN modulator 20 is optimized (the "no phase variation" state in the figure) as a reference. It is apparent from FIG. 2 that even with the phase shift as slight as 5 ps (1 mm when converted to a coaxial cable length), the waveform of the CS-RZ signal light is deteriorated greatly. Furthermore, in the spectrum of the CS-RZ signal light, in the state with no phase variation, a carrier is not present at the center wavelength (frequency) of the spectrum of the signal light, but carrier are present at positions apart from the center wavelength by frequencies of $\pm 1 \times B/2$, $\pm 3 \times B/2$, $\pm 5 \times B/2$, ... (if n is generalized as a positive number of one or greater, then $\pm(2n-1) \times B/2$) Hz, respectively. On the other hand, in a state in which the phase shift has occurred, in addition to the aforementioned carrier, it is apparent that carriers are also present at positions apart from the center wavelength by frequencies of $\pm 1 \times B$, $\pm 2 \times B$, ... (if n is generalized as a positive number of one or greater, then $\pm n \times B$) Hz, respectively.

Consequently, in the present embodiment, the phase shift is determined by focusing on the carrier at the position apart from the center wavelength of the spectrum of the signal light by $\pm n \times B$ Hz, and the feedback control of each phase shifter 25A, 25B is performed so that the phase difference between the drive signals corresponding to the clock signal is optimized.

In other words, in the narrow band optical filter 32A used in the monitor 30 in FIG. 1, the center wavelength of the transmission band thereof is set to any position apart from the center wavelength of the spectrum of the CS-RZ signal light by a frequency of $\pm n \times B$ Hz, and the feedback control is performed on the phase adjustment amounts in the phase shifters 25A, 25B by the control CPU 40 so that the power of the monitor light extracted by the narrow band optical filter 32A is minimized. Specifically, for example, when generating a 40 GHz CS-RZ signal light for which the center wavelength is set to 1552 nm or the like as shown in the optical spectrum in FIG. 3, the transmission center wavelength of the narrow band optical filter 32A is set to a position moved to the long wavelength side of the center wavelength of the spectrum by the frequency of 40 GHz. In FIG. 3, the portion indicated by the dotted line corresponds to the transmission band of the narrow band optical filter 32A. It is apparent from the dotted line portion in FIG. 3 that the power of the carrier component included in the monitor light extracted in the narrow band optical filter 32A decreases as the phase variation between the drive signals becomes smaller, and therefore by feedback controlling the phase shifters 25A, 25B so that the power of the monitor light measured in the optical power meter 33 has the smallest value, the phase difference between the drive signals corresponding to the clock signal can be minimized.

Here, an example was shown in which the transmission center wavelength of the narrow band optical filter 32A is set to the position moved to the long wavelength side of the center wavelength of the spectrum of the CS-RZ signal light by the frequency of 40 GHz, but the present invention is not limited to this example, and the transmission center wavelength of the narrow band optical filter 32A may be set to any position apart from the spectrum center wavelength of the CS-RZ signal light by the frequency of $\pm n \times B$ Hz (n =2, 3, ... ).

According to the first embodiment as described above, by monitoring variation in the carrier component generated at a specific frequency of the CS-RZ signal light, the phase shift between the drive signals corresponding to the clock signal can be accurately detected and the feedback control can be performed. Consequently, it becomes possible to generate the CS-RZ signal light under stable drive conditions. Such an optical modulator is suitable for use as, for example, the optical modulator for an optical transmission apparatus used in an ultra high speed optical transmission system using the CS-RZ modulation method.

Next is a description of a second embodiment of the present invention.

Figure 4:
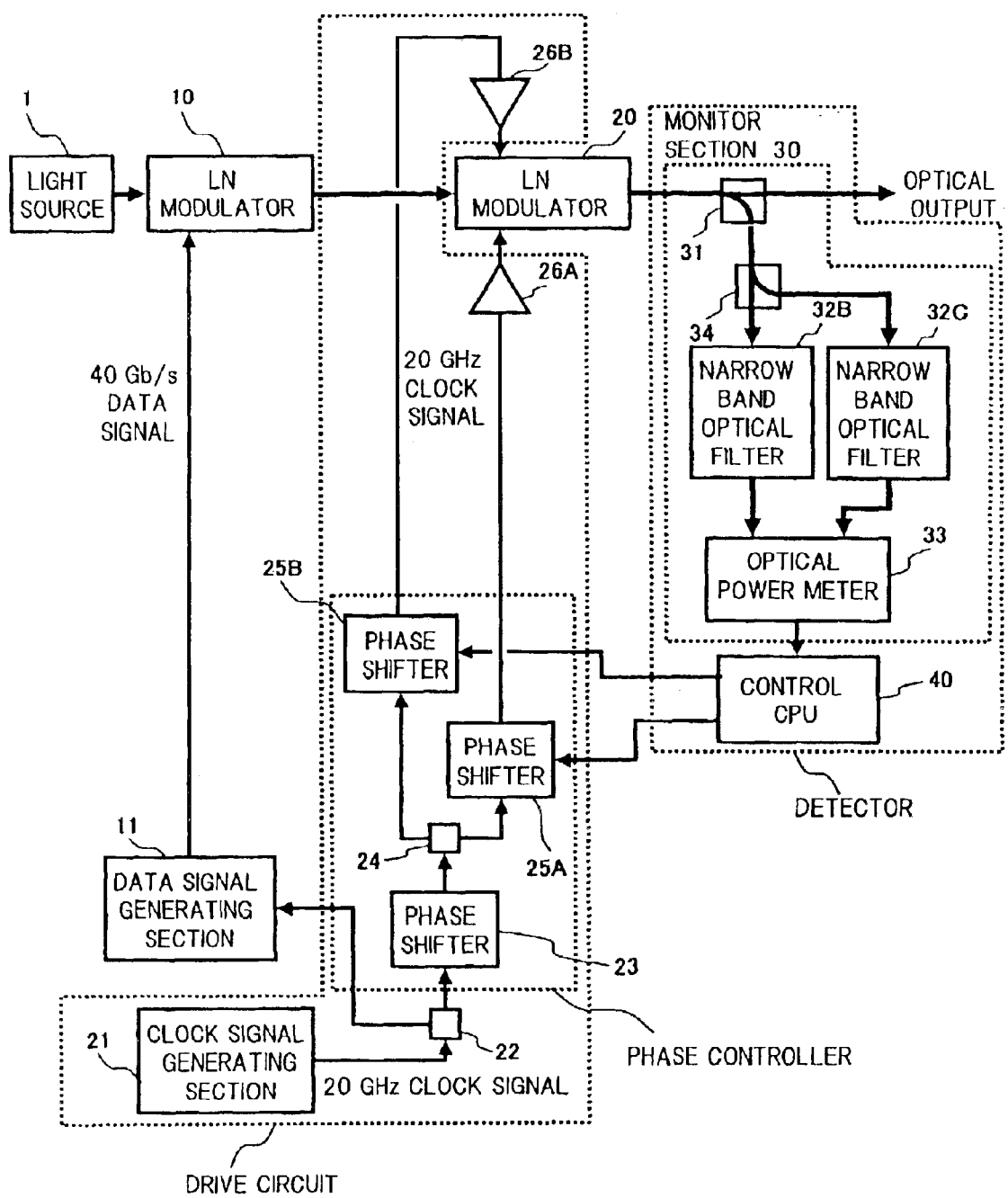
FIG. 4 is a block diagram showing the structure of a second embodiment of a control apparatus for an optical modulator according to the present invention.

FIG. 4 is a block diagram showing the structure of the second embodiment of a control apparatus for an optical modulator according to the present invention. Those components the same as those in the first embodiment are labeled with the same numerals and description thereof is omitted, and this also applies for all other embodiments below.

In FIG. 4, the structure of the second embodiment differs from the structure of the first embodiment in that an optical coupler 34 and two narrow band optical filters 32B, 32C are provided instead of the narrow band optical filter 32A in the monitor section 30. The construction of all other components is the same as in the first embodiment.

The optical coupler 34 further splits the monitor light, which was split in the optical coupler 31, into two, to send them to the narrow band optical filters 32B and 32C, respectively. Each of the narrow band optical filters 32B, 32C has a sufficiently narrow bandwidth of the transmission band, and a center wavelength of this transmission band which has filter characteristics set to any position apart from the spectrum center wavelength of the CS-RZ signal light by a frequency of ±(2n−1)×B/2 Hz, where the bit rate of the data signal is Bb/s and n is a positive number of one or greater. Each of the narrow band optical filters 32B, 32C extracts only a desired frequency component from the monitor light split by the optical coupler 34, to output this component to the optical power meter 33.

In the second embodiment of such a construction, the power of each monitor light extracted in each of the narrow band optical filters 32B and 32C is measured in the optical power meter 33, and the feedback control is performed on the phase adjustment amount in each phase shifter 25A, 25B by the control CPU 40, based on the measurement results. Here, the feedback control by the control CPU 40 is performed, as shown in FIG. 2, by focusing on the fact that when the phase difference between the drive signals corresponding to the clock signal, varies from an optimal value, a difference in power occurs between a carrier component apart from the spectrum center wavelength of the CS-RZ signal light by a frequency of −(2n−1)×B/2 Hz and a carrier component apart by +(2n−1)×B/2 Hz.

In other words, the control CPU 40 feedback controls the phase adjustment amounts in the respective phase shifter 25A, 25B so that the power of each monitor light extracted in each narrow band optical filter 32B, 32C is approximately equal. Specifically, when generating a 40 GHz CS-RZ signal light with the center wavelength set to 1552 nm or similar, as shown by the optical spectrum in FIG. 5, the transmission center wavelength of the narrow band optical filter 32B is set to a position moved to the short wavelength side of the spectrum center wavelength of this signal light by a frequency of 20 GHz, and furthermore, the transmission center wavelength of the narrow band optical filter 32C is set to a position moved to the long wavelength side of the spectrum center wavelength of this signal light by a frequency of 20 GHz. As is apparent from the dotted line portions in FIG. 5, because the power of the carrier components included in each monitor light extracted by each narrow band optical filter 32B, 32C approach the same value as the phase variation between the drive signals become small, then by feedback controlling the phase shifters 25A, 25B so that the power value of each monitor light as measured by the optical power meter 33 is approximately equal, the phase difference between the drive signals corresponding to the clock signal can be optimized.

Moreover, here, an example was shown in which the transmission center wavelengths of each narrow band optical filter 32B, 32C were set to positions apart from the spectrum center wavelength of the CS-RZ signal light by a frequency of ±20 GHz respectively. However, the present invention is not limited to this example, and the transmission center wavelength of each narrow band optical filter 32B, 32C may be set to any position apart from the spectrum center wavelength of the CS-RZ signal light by a frequency of ±(2n−1)×B/2 Hz (n=2, 3, . . . ).

According to the second embodiment described above, by monitoring the variation of the carrier component which occurs at two specific frequencies in the CS-RZ signal light, the phase shift between the drive signals corresponding to the clock signal can be detected accurately, and the feedback control can be performed, and consequently it becomes possible to generate the CS-RZ signal light under stable drive conditions.

Next is a description of a third embodiment of the present invention.

Figure 6:
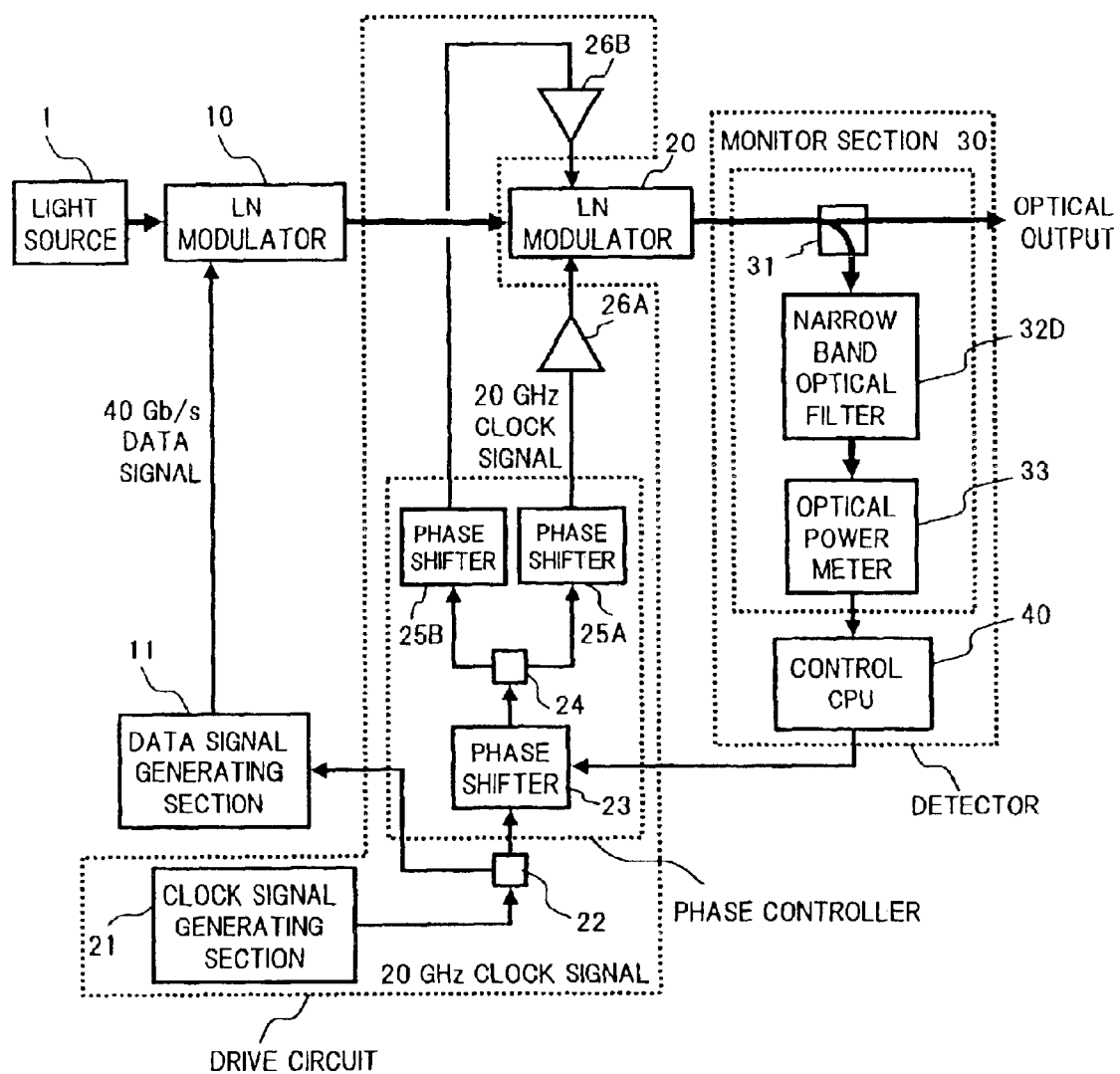
FIG. 6 is a block diagram showing the structure of a third embodiment of a control apparatus for an optical modulator according to the present invention.

FIG. 6 is a block diagram showing the structure of the third embodiment of a control apparatus for an optical modulator according to the present invention.

In FIG. 6, the structure of the third embodiment differs from the structure of the first embodiment in that a narrow band optical filter 32D is provided instead of the narrow band optical filter 32A in the monitor section 30, and a feedback control of the phase adjustment amount in the phase shifter 23 that adjusts the phase of the clock signal to control the phase difference between the clock signal and the data signal, is performed by the control CPU 40. Other components are the same as those in the first embodiment.

The narrow band optical filter 32D has filter characteristics in which a bandwidth of the transmission band is sufficiently narrow and a center wavelength of the transmission band is coincident with the spectrum center wavelength of the CS-RZ signal light, and extracts only a desired frequency component from the monitor light split by the optical coupler 31, to send this component to the optical power meter 33. The control CPU 40 feedback controls the phase shifter 23 based on the power of the monitor light as measured in the optical power meter 33, using the variation characteristics of the CS-RZ signal light spectrum relative to the phase variation between the data signal and the clock signal, as described below.

FIG. 7 is a diagram showing the test results of measuring the spectrum and optical waveform of the CS-RZ signal light generated when the phases of the data signal and the clock signal are varied. Here, the phase of the clock signal is varied so that the phase shift increases in units of 5 ps, with a state in which the phase difference between the data signal and the clock signal is optimized (the "no phase variation" state in the figure), as a reference. It is apparent from FIG. 7 that even with the phase shift as slight as 5 ps (1 mm when converted to a coaxial cable length), the waveform of the CS-RZ signal light is deteriorated greatly. Furthermore, in the spectrum of the CS-RZ signal light, it is apparent that when the phase difference between the data signal and the clock signal deviates from its optimum point, the power of the spectrum center wavelength of the CS-RZ signal light decreases.

Consequently, in the present embodiment, the phase shift is determined by focusing on the power of the spectrum center wavelength of the CS-RZ signal light, and the feedback control of the phase shifter 23 is performed so that the phase difference between the data signal and the clock signal is optimized.

Specifically, for example, when generating a 40 GHz CS-RZ signal light for which the center wavelength is set to 1552 nm or the like, as shown in the optical spectrum in FIG. 8, the transmission center wavelength of the narrow band optical filter 32D is set to be coincident with the spectrum center wavelength of the signal light. As is apparent from the dotted line portion in FIG. 8, the power of the monitor light extracted by this narrow band optical filter 32D increases as the phase variation between the data signal and the clock signal decreases, and therefore by feedback controlling the phase shifter 23 so that the power level of the monitor light as measured by the optical power meter 33 is maximized, the phase difference between the data signal and the clock signal can be optimized.

According to the third embodiment as described above, by monitoring the power variation in the spectrum center wavelength of the CS-RZ signal light, the phase shift between the data signal and the clock signal can be detected accurately, and the feedback control can be performed. Consequently it becomes possible to generate the CS-RZ signal light under stable drive conditions.

Next is a description of a fourth embodiment of the present invention. In the fourth embodiment, consideration is given to the possibility of simultaneously realizing both optimization of the phase difference between the drive signals corresponding to the clock signal, and optimization of the phase difference between the data signal and the clock signal, by means of a combination of the first embodiment and the third embodiment.

Figure 9:
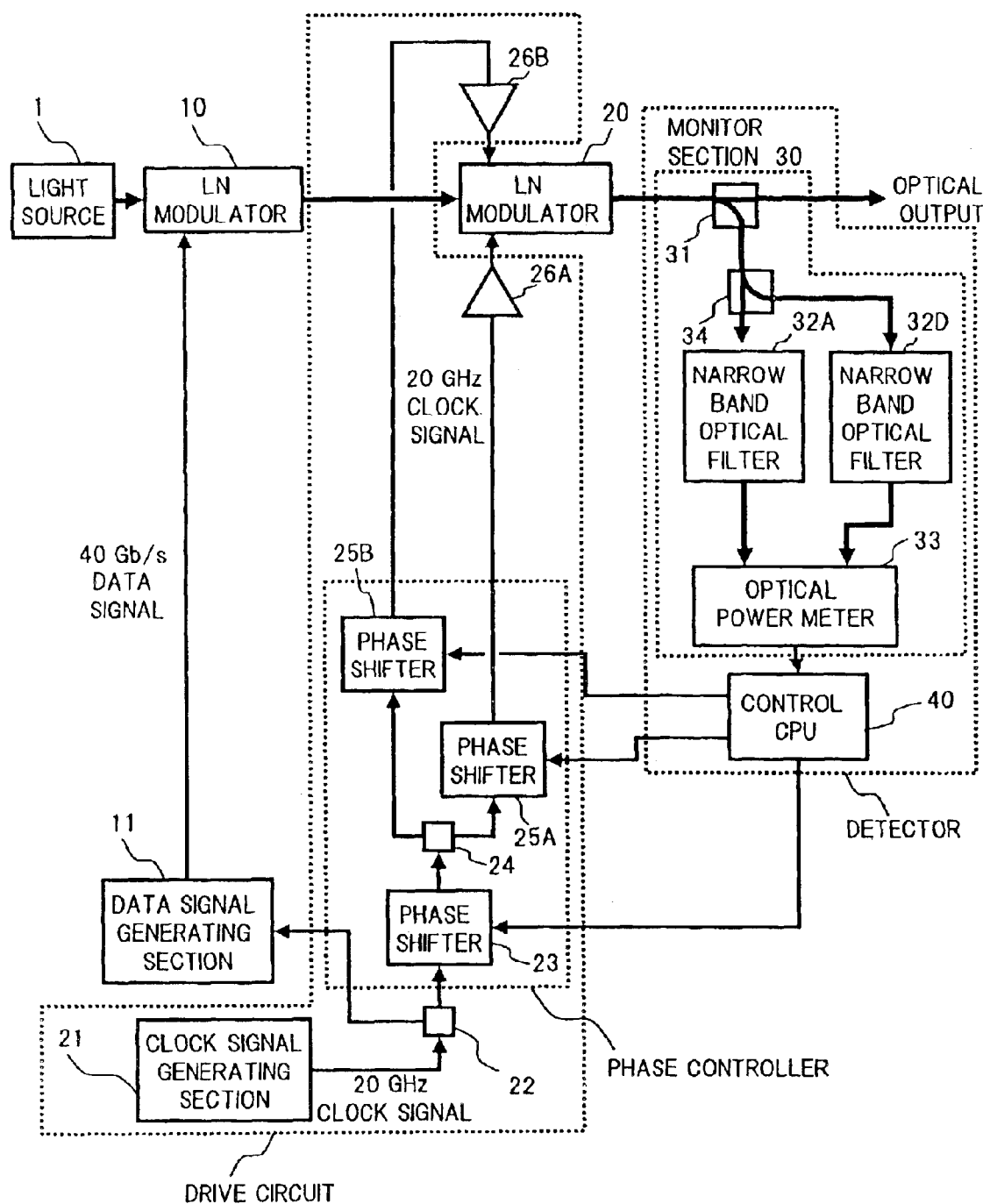
FIG. 9 is a block diagram showing the structure of a fourth embodiment of a control apparatus for an optical modulator according to the present invention.

FIG. 9 is a block diagram showing the structure of the fourth embodiment of a control apparatus for an optical modulator according to the present invention.

In the structure shown in FIG. 9, in the monitor section 30, the monitor light which was split by the optical coupler 31 is further split into two by the optical coupler 34, and one of the split lights is sent to the narrow band optical filter 32A, as used in the first embodiment, and the other split light is sent to the narrow band optical filter 32D, as used in the third embodiment. The power of each monitor light extracted by the narrow band optical filters 32A, 32D respectively is then measured by the optical power meter 33, and the feedback control of the phase adjustment amount in each of the phase shifters 23, 25A and 25B is performed by the control CPU 40 based on the measurement results.

The feedback control by the CPU 40 is performed so that, as specifically shown in FIG. 10, for example, the phase shifters 25A, 25B are feedback controlled so as to minimize the power of the monitor light extracted by the narrow band optical filter 32A, thereby optimizing the phase difference between the drive signals corresponding to the clock signal. Furthermore, the phase shifter 23 is feedback controlled so as to maximize the power of the monitor light extracted by the narrow band optical filter 32D, thereby optimizing the phase difference between the data signal and the clock signal.

According to the fourth embodiment described above, the phase shift between the drive signals corresponding to the clock signal, and the phase shift between the clock signal and the data signal can be detected simultaneously, and the feedback control can be then performed. Consequently it becomes possible to generate the CS-RZ signal light under even more stable drive conditions.

Next is a description of a fifth embodiment of the present invention. In the fifth embodiment, consideration is given to the possibility of simultaneously realizing both optimization of the phase difference between the drive signals corresponding to the clock signal, and optimization of the phase difference between the data signal and the clock signal, by means of a combination of the second embodiment and the third embodiment.

Figure 11:
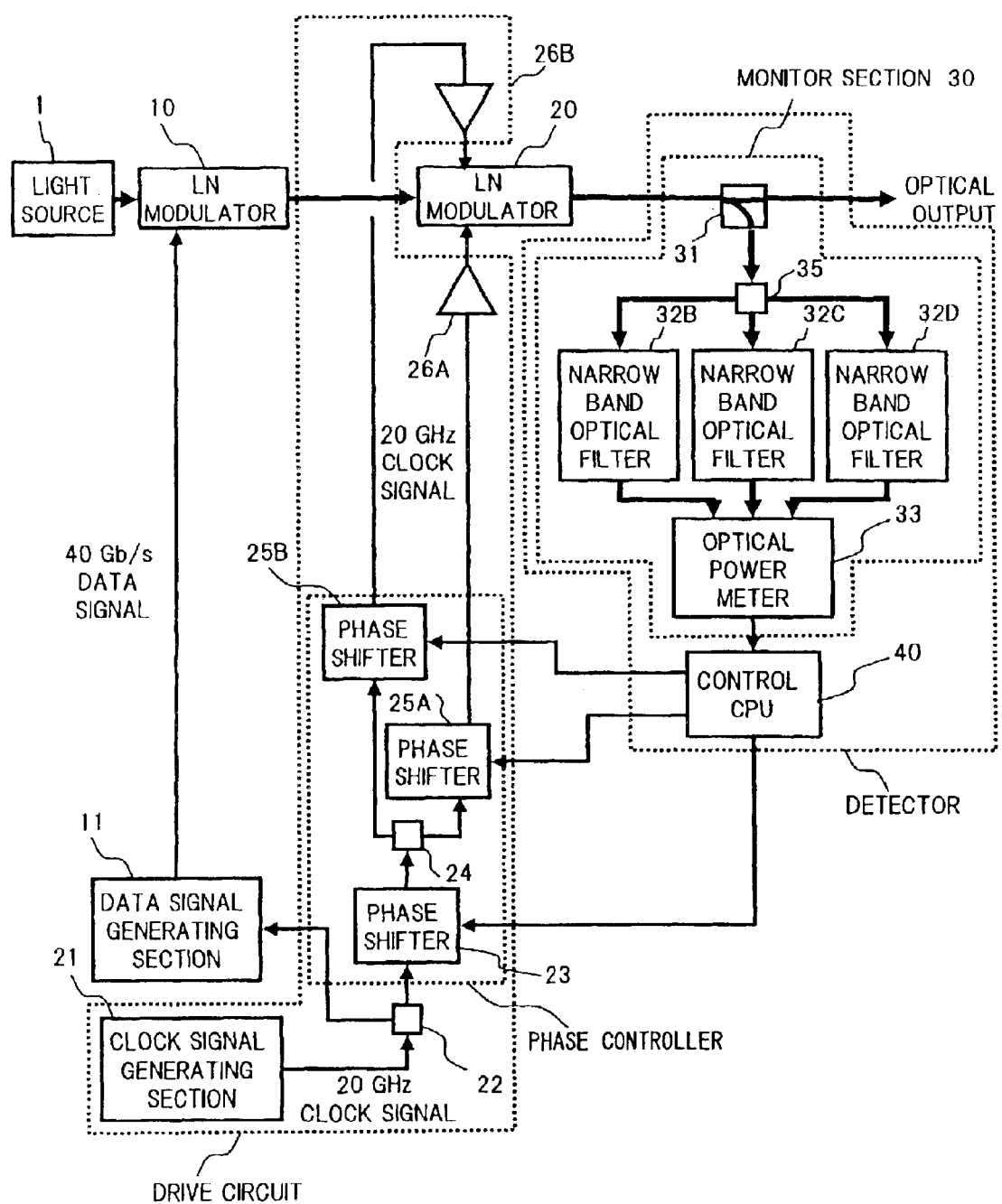
FIG. 11 is a block diagram showing the structure of a fifth embodiment of a control apparatus for an optical modulator according to the present invention.

FIG. 11 is a block diagram showing the structure of the fifth embodiment of a control apparatus for an optical modulator according to the present invention.

In the structure shown in FIG. 11, in the monitor section 30, the monitor light which was split by the optical coupler 31 is further split into three by the optical coupler 35, and the first and second of these split lights are respectively sent to the narrow band optical filters 32B and 32C, as used in the second embodiment, and the third of these split lights is sent to the narrow band optical filter 32D, as used in the third embodiment. The power of each monitor light extracted by the narrow band optical filters 32B, 32C and 32D respectively is then measured by the optical power meter 33, and the feedback control of the phase adjustment amount in each of the phase shifters 23, 25A and 25B is performed by the control CPU 40 based on the measurement results.

Figure 12:
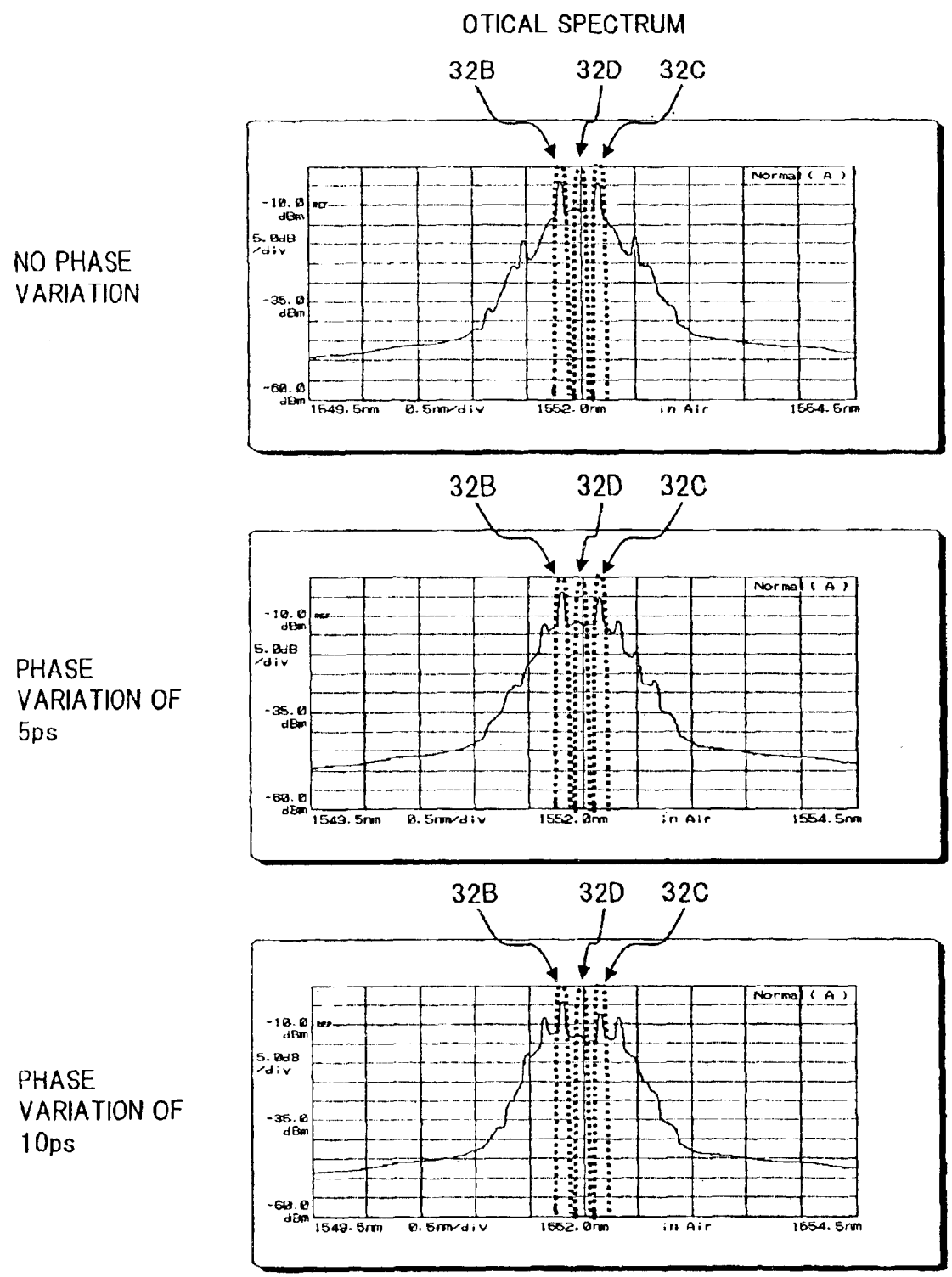
FIG. 12 is a diagram showing specifically spectra of the CS-RZ signal light generated in the fifth embodiment described above, in response to phase variation.

The feedback control by the CPU 40 is performed so that, as specifically shown in FIG. 12, for example, the phase shifters 25A, 25B are feedback controlled so that the power of each monitor light extracted by the narrow band optical filters 32B and 32C becomes substantially equal, thereby optimizing the phase difference between the drive signals corresponding to the clock signal. Furthermore, the phase shifter 23 is feedback controlled so as to maximize the power of the monitor light extracted by the narrow band optical filter 32D, thereby optimizing the phase difference between the data signal and the clock signal.

Also in the fifth embodiment described above, similarly to the case of the fourth embodiment, the phase shift between the drive signals corresponding to the clock signal, and the phase shift between the clock signal and the data signal, can be detected simultaneously and the feedback control can be then performed. Consequently it becomes possible to generate the CS-RZ signal light under even more stable drive conditions.

Figure 13:
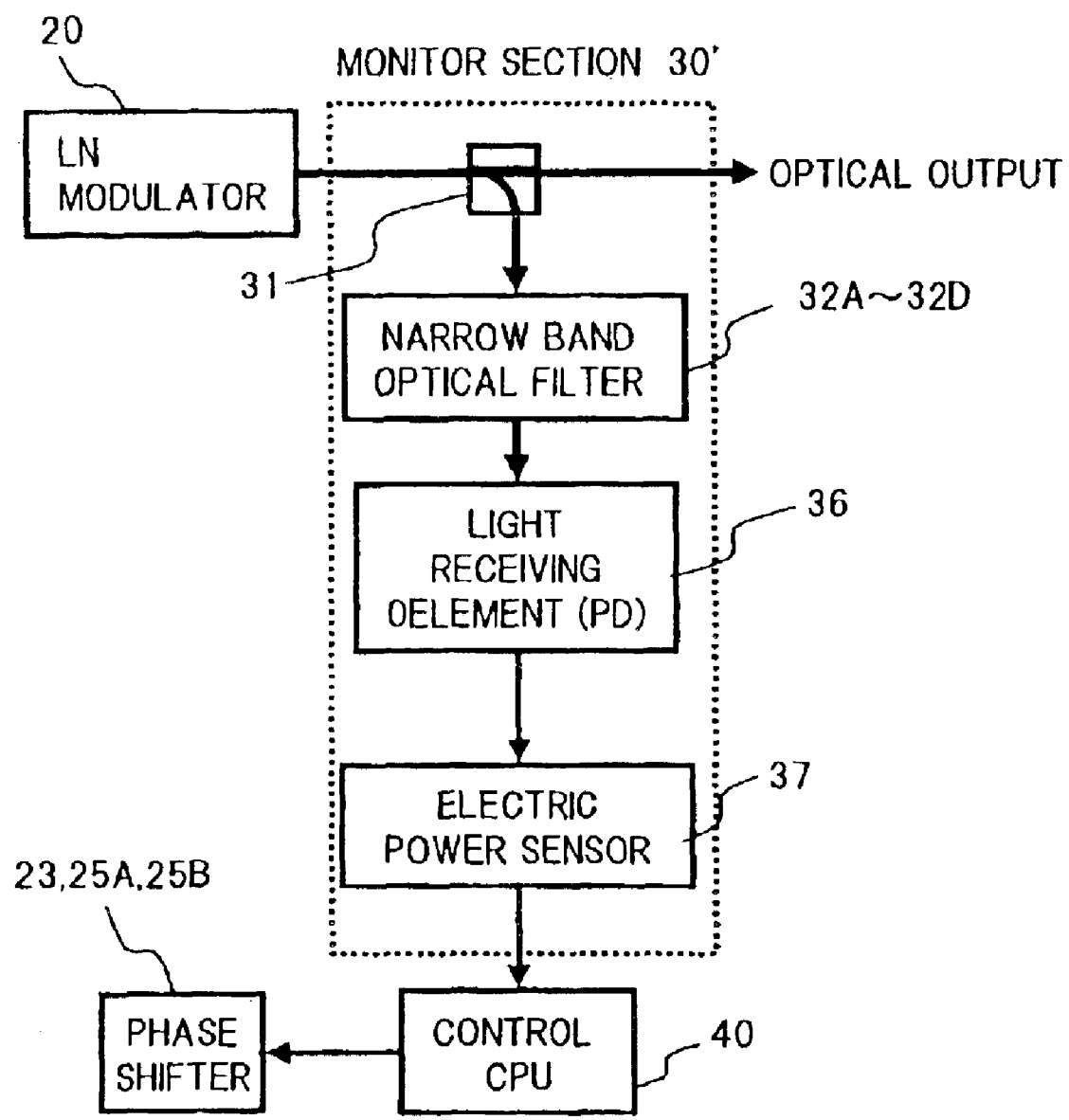
FIG. 13 is a block diagram showing an example of another construction of a monitor section related to each of the embodiments of the present invention.
Figure 18:
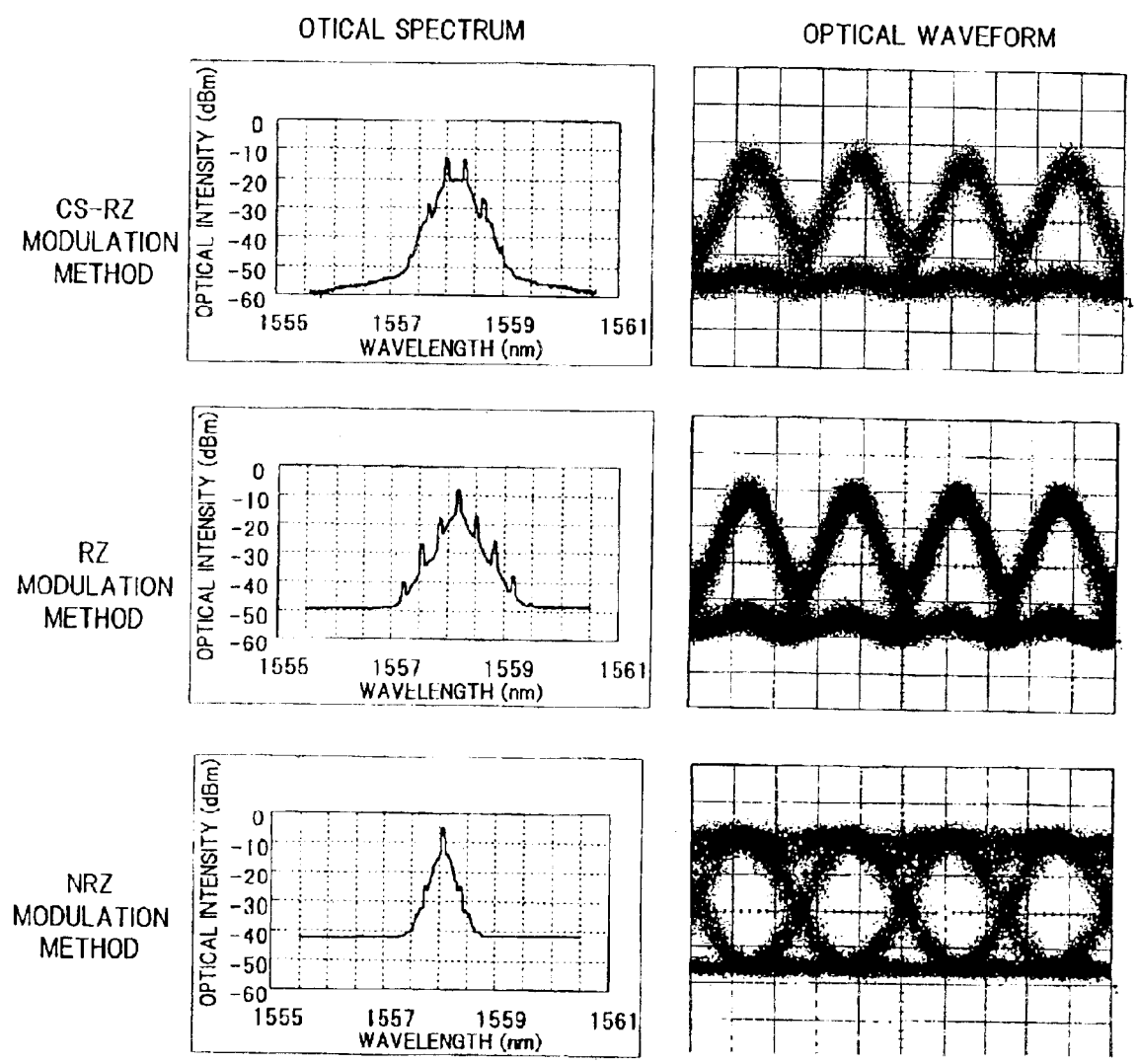
FIG. 18 is a diagram showing test results for explaining the characteristics of the optical spectrum and optical waveform of the CS-RZ signal light.

Moreover, in the first through fifth embodiments described above, the example was described in which the power of the monitor light extracted by each of the narrow band optical filters 32A through 32D in the monitor 30 was measured using the optical power meter 33. However, the present invention is not limited to this example, and as shown in a monitor section 30' in FIG. 13, a construction in which, for example, the monitor light extracted by each of the narrow band optical filters 32A through 32D is received by a light receiving element 36 such as a photodiode (PD) to be converted to an electrical signal, and the power of this electric signal is then measured using an electric power sensor 37, may also be used.

Furthermore, the generation of 40 Gb/s CS-RZ signal light in accordance with the data signal with the bit rate of 40 Gb/s and the clock signal with the frequency of 20 GHz was described. However, the setting of the bit rate in the present invention is not limited to this specific example.

In FIG. 1, FIG. 4, FIG. 6, FIG. 9 and FIG. 11, the drive circuit comprises the clock signal generating section 21, splitters 22, 24, phase shifters 23, 25A, 25B and amplifiers 26A, 26B. Furthermore, the phase controller comprises the phase shifters 23, 25A and 26B. In addition, the detector comprises the monitor section and control CPU 40.

What is claimed are:

1. A control apparatus for an optical modulator which generates a signal light corresponding to the CS-RZ modulation method, comprising:

a monitor section that extracts a specific frequency component from a spectrum of the signal light output from said optical modulator to detect the optical intensity thereof; and a control section that determines a phase shift between a plurality of drive signals supplied to said optical modulator based on the optical intensity detected by said monitor section, and controls a phase difference between said drive signals so that said phase shift is minimized.

2. A control apparatus for an optical modulator according to claim 1, wherein said optical modulator includes a data side optical modulation section to which a drive signal corresponding to a data signal is supplied, and a clock side optical modulation section to which at least two drive signals corresponding to a clock signal with a frequency of ½ times the bit rate of said data signal are supplied, and said control section determines, based on the optical intensity detected in said monitor section, at least one of a phase shift between the drive signals supplied to said clock side optical modulation section, and a phase shift between the data signal and the clock signal, to feedback control a phase difference between these signals so that said phase shift is minimized.

3. A control apparatus for an optical modulator according to claim 2, wherein when the feedback control for the phase shift between the drive signals supplied to said clock side optical modulator is performed, said monitor section includes an optical filter capable of extracting a frequency component apart by n×B Hz from a central frequency of the spectrum of the signal light output from said optical modulator, where the bit rate of the data signal is Bb/s and n is a positive number of one or greater, and detects the optical intensity of the frequency component extracted from said signal light by said optical filter, and said control section feedback controls the phase difference between the drive signals supplied to said clock side optical modulation section so that the optical intensity detected by said monitor section is minimized.

4. A control apparatus for an optical modulator according to claim 2, wherein when the feedback control for the phase shift between the drive signals supplied to said clock side optical modulator is performed, said monitor section includes a first optical filter capable of extracting a frequency component apart by −(2n−1)×B/2 Hz from a central frequency of the spectrum of the signal light output from said optical modulator, and a second optical filter capable of extracting a frequency component apart by +(2n−1)×B/2 Hz from the central frequency of the spectrum of said signal light, where the bit rate of the data signal is Bb/s and n is a positive number of one or greater, and detects the optical intensities of the respective frequency components extracted from said signal light by said optical filters, and said control section feedback controls the phase difference between the drive signals supplied to said clock side optical modulation section so that the respective optical intensities detected by said monitor section are approximately equal.

5. A control apparatus for an optical modulator according to claim 2, wherein when the feedback control for the phase shift between the data signal and the clock signal is performed, said monitor section includes an optical filter capable of extracting a frequency component coinciding with a central frequency of the spectrum of the signal light output from said optical modulator, and measures the optical intensity of the frequency component extracted from said signal light by said optical filter, and said control section feedback controls the phase difference between the data signal and the clock signal so that the optical intensity measured by said monitor section is maximized.

6. A control apparatus for an optical modulator according to claim 1, wherein said monitor section includes an optical power meter measuring the optical intensity of a specific frequency component extracted from the spectrum of the signal light output from said optical modulator.

7. A control apparatus for an optical modulator according to claim 1, wherein said monitor section includes a light receiving element that receives a specific frequency component extracted from the spectrum of the signal light output from said optical modulator, to generate an electrical signal corresponding to the optical intensity, and an electric power sensor that measures the power of electrical signal generated by said light receiving element.

8. A control apparatus for an optical modulator comprising:

an optical modulator incorporating a section for branching an optical waveguide into a first branch optical waveguide and a second branch optical waveguide, and a section for combining these first and second branch optical waveguides, that controls the refractive indexes of said first and second branch optical waveguides using a first electrode and a second electrode which are provided in said first and second branch optical waveguides respectively, to obtain periodic optical intensity characteristics corresponding to a difference between the refractive indexes;

a drive circuit that applies a voltage to said first and second electrodes so that a modulation operation is performed based on one cycle of optical intensity characteristics of said optical modulator;

a phase controller that controls a phase of said drive circuit; and a detector that detects a specific optical wavelength component in an output of said optical modulator, wherein the phase of said drive circuit is controlled by said phase controller based on the detection result from said detector.

9. An optical transmitter for transmitting a signal light corresponding to the CS-RZ modulation method, comprising:

a light source that generates continuous light;

a modulator that modulates the continuous light from said light source, in accordance with the CS-RZ modulation method;

a monitor section that extracts a specific frequency component from a spectrum of the signal light output from said optical modulator to detect the optical intensity thereof; and a control section that determines a phase shift between a plurality of drive signals supplied to said optical modulator based on the optical intensity detected by said monitor section, and controls a phase difference between said drive signals so that said phase shift is minimized.

10. A method of controlling an optical modulator which generates a signal light corresponding to the CS-RZ modulation method, comprising:

extracting a specific frequency component from a spectrum of the signal light output from said optical modulator to detect the optical intensity thereof;

determining a phase shift between a plurality of drive signals supplied to said optical modulator, based on said optical intensity; and controlling a phase difference between said drive signals so that said phase shift is minimized.

* * * * *

UNITED STATES PATENT AND TRADEMARK OFFICE
CERTIFICATE OF CORRECTION

PATENT NO. : 6,809,849 B2
DATED : October 26, 2004
INVENTOR(S) : Yuichi Akiyama et al.

It is certified that error appears in the above-identified patent and that said Letters Patent is hereby corrected as shown below:

<u>Title page,</u>
Item [54], Title, please change "METHOD" second occurence to -- MODULATOR --.
Item [56], References Cited, OTHER PUBLICATIONS, please change "8=40" to
-- 8x40 --; and "zero dispersion" to -- zero-dispersion --.

Signed and Sealed this

First Day of March, 2005

JON W. DUDAS
*Director of the United States Patent and Trademark Office*